UNITED STATES PATENT OFFICE.

DAVID BEATTY, OF BERKELEY, CALIFORNIA.

BAKING-POWDER.

1,034,677.      Specification of Letters Patent.      Patented Aug. 6, 1912.

No Drawing.      Application filed August 21, 1911. Serial No. 645,080.

*To all whom it may concern:*

Be it known that I, DAVID BEATTY, a citizen of the United States, residing at Berkeley, in the county of Alameda and State of California, have invented new and useful Improvements in Baking-Powder, of which the following is a specification.

The object of the present invention is to provide a baking powder which shall contain as little mineral matter as possible, and which will therefore not be injurious to health, which will be as cheap as, or cheaper than the best baking powders at present on the market, and which, while possessing the above advantages, will very efficiently perform its function of raising the dough for making bread.

The best baking powders on the market are made from cream of tartar and soda, and no baking powder extensively used, so far as I am aware, is formed of racemic or tartaric acid and soda. Racemic or tartaric acid is preferable to cream of tartar for the reason that it has more than double the power of causing the soda with which it is commingled to give off the gas which is requisite for raising the dough; but it has not been extensively used for the reasons that the action of these acids is very rapid, and also that tartaric acid is hygroscopic. It is true that it has been attempted to use tartaric acid by mixing it with albumen, the object of such mixture being, first, to prevent the tartaric acid from absorbing moisture, and, second, to retard its action when mixed with soda. The objection to such a baking powder is its high cost on account of the high price of albumen.

The object of the present invention is to provide a baking powder which will be as effective as that last referred to, and at the same time far cheaper.

In practising my invention, I extract the starch from ordinary wheat flour and I then dry the residual gluten and oils at a temperature below that at which the gluten would be injuriously affected and I then finely pulverize the same. I then mix racemic or tartaric acid with five per centum of its own weight of water, so as to reduce it to a pasty mass. I then mix, with the racemic or tartaric acid in this pasty form, the pulverized product above obtained, in the proportion of ten to thirty per centum according to the rate at which it is desired that the baking powder which is to be produced thereform should give off the gas. I then add to the mixture thus obtained bicarbonate of soda in the proportion necessary to neutralize the racemic or tartaric acid, that is, substantially the same amount by weight. The action of the baking powder may be further retarded by mixing with the gluten a further quantity of any suitable dry fat, as stearic acid, butter fat, spermaceti, or the like. As compared with the best baking powder made from cream of tartar the baking powder thus made contains less than half the quantity of mineral substance and is equally as efficacious in raising dough, is cheaper, and is free from objectionable flavors.

I prefer racemic acid to ordinary tartaric acid because it is efflorescent instead of deliquescent. However an inferior form of my invention may be obtained by using ordinary tartaric acid. But since racemic acid is not chemically different from dextro-tartaric acid, which is the form commonly known as tartaric acid, I shall in the claims use the term "tartaric acid" in this sense, that is, having the generic meaning including both tartaric acid ordinarily so called, and racemic acid.

For the purpose of retarding the action the gluten may be mixed with the bicarbonate of soda as well as, or instead of, with the racemic or tartaric action.

I claim:—

1. A baking powder consisting of a tartaric acid, gluten, and bicarbonate of soda.

2. A baking powder consisting of racemic acid, gluten, and bicarbonate of soda.

In testimony whereof I have hereunto set my hand in the presence of two subscribing witnesses.

DAVID BEATTY.

Witnesses:
  F. M. WRIGHT,
  D. B. RICHARDS.

---

Copies of this patent may be obtained for five cents each, by addressing the "Commissioner of Patents, Washington, D. C."